US007814057B2

(12) United States Patent
Kathuria et al.

(10) Patent No.: US 7,814,057 B2
(45) Date of Patent: Oct. 12, 2010

(54) PAGE RECOVERY USING VOLUME SNAPSHOTS AND LOGS

(75) Inventors: Vishal Kathuria, Woodinville, WA (US); Michael J Zwilling, Redmond, WA (US); Hanumantha R Kodavalla, Sammamish, WA (US); Steven R Schmidt, Redmond, WA (US); Martin J Sleeman, Redmond, WA (US); Rajeev B Rajan, Kirkland, WA (US); Artem A Oks, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 385 days.

(21) Appl. No.: 11/099,021

(22) Filed: Apr. 5, 2005

(65) Prior Publication Data

US 2006/0224636 A1  Oct. 5, 2006

(51) Int. Cl.
*G06F 7/00* (2006.01)
(52) U.S. Cl. ............... 707/646; 707/650; 707/648
(58) Field of Classification Search ........... 707/202, 707/204, 201, 203, 646, 650, 648; 711/161, 711/162
See application file for complete search history.

(56) References Cited

U.S. PATENT DOCUMENTS

| 5,493,649 | A * | 2/1996 | Slivka et al. ............... 714/48 |
| 5,720,026 | A * | 2/1998 | Uemura et al. .............. 714/6 |
| 5,758,359 | A * | 5/1998 | Saxon ..................... 707/204 |
| 5,978,813 | A * | 11/1999 | Foltz et al. ............... 707/201 |
| 6,076,148 | A * | 6/2000 | Kedem .................... 711/162 |
| 6,665,815 | B1 * | 12/2003 | Goldstein et al. .......... 714/20 |
| 6,785,786 | B1 * | 8/2004 | Gold et al. ............... 711/162 |
| 6,912,631 | B1 * | 6/2005 | Kekre et al. .............. 711/162 |
| 7,107,486 | B2 * | 9/2006 | Okada et al. .............. 714/20 |
| 7,246,275 | B2 * | 7/2007 | Therrien et al. ........... 714/710 |
| 7,290,102 | B2 * | 10/2007 | Lubbers et al. ........... 711/162 |
| 2002/0147941 | A1 * | 10/2002 | Gentile .................... 714/36 |
| 2004/0167943 | A1 * | 8/2004 | Margolus ................. 707/204 |
| 2005/0015415 | A1 * | 1/2005 | Garimella et al. ......... 707/204 |
| 2005/0131966 | A1 * | 6/2005 | Lou ....................... 707/204 |
| 2005/0132351 | A1 * | 6/2005 | Randall et al. ............ 717/168 |
| 2005/0182797 | A1 * | 8/2005 | Adkins et al. ............ 707/200 |
| 2005/0235016 | A1 * | 10/2005 | Amano et al. ............ 707/204 |
| 2006/0080362 | A1 * | 4/2006 | Wagner et al. ........... 707/200 |

OTHER PUBLICATIONS

Ann L. Chervenak, Vivekanand Vellanki, Zachary Kurmas, Protecting File Systems: A Survey of Backup Techniques, GA Tech University, p. 17-32.*

* cited by examiner

*Primary Examiner*—Hosain T Alam
*Assistant Examiner*—Amy Ng
(74) *Attorney, Agent, or Firm*—Workman Nydegger

(57) ABSTRACT

Systems and methods are disclosed that facilitate providing page-level database restore functionality upon detection of a corruption event. Updates to a data page in a database can trigger generation of a snapshot of the data page, and an update log can be maintained that stores information related to page updates. Subsequent snapshots can be generated at predetermined intervals and can trigger truncation of a log segment and initiation of a new log segment. Upon detection of page corruption, a most-recent uncorrupt snapshot of the corrupt page can be identified, copied to the location of the corrupt page in the database, and modified according to the log segment associated with the uncorrupt snapshot to make the page current as of the corrupting event, all of which can be performed to restore the database without having to take the database offline.

4 Claims, 12 Drawing Sheets

PAGE RECOVERY USING VOLUME SNAPSHOTS AND LOGS

TECHNICAL FIELD

The subject invention relates generally to database management, and more particularly to automatically backing up and restoring databases resident upon consumer computing devices.

BACKGROUND OF THE INVENTION

Computers and computer-based devices have become a necessary tool for many applications throughout the world. Typewriters and slide rules have become obsolete in light of keyboards coupled with sophisticated word-processing applications and calculators that include advanced mathematical functions/capabilities. Thus, trending applications, analysis applications, and other applications that previously may have required a collection of mathematicians or other high-priced specialists to painstakingly complete by hand can now be accomplished through use of computer technology. To properly effectuate the aforementioned applications as well as other applications that utilize data within databases, such data must be accessible and be free from corruption. Businesses that have sufficient resources can employ one or more database administrators (DBAs) to ensure that data within a database remains available to users and/or applications accessing such database. For instance, a DBA can schedule a backup of data within the database in case of occurrence of corruption therein, and thereafter effectuate such backup. If problems exist within a first copy of the data (e.g., data therein is corrupted), the second copy of the data can be utilized to restore such first copy.

As can be assumed, DBAs are a significant expense with respect to database management. For instance, DBAs typically are associated with advanced and specialized skill in the field of databases. Accordingly, individual users do not employ DBAs to monitor their hard drives to ensure data integrity therein. Furthermore, many conventional computer systems are not associated with database engines—thus rendering DBAs useless in connection with such systems. As hard drive space has expanded, however, employing database technology in consumer-level computers (such as desktop computers, laptop computers, and the like) is becoming increasingly popular. Therefore, similar problems existent with respect to database servers (e.g., data corruption) are becoming prevalent with respect to consumer-level computers.

Given the above, it is apparent that individual users, small businesses, and any other user/entity not employing a DBA to manage their database(s) is subject to various catastrophes associated with data corruption. For instance, if particular pages within a database file are subject to corruption, and no adequate backup system exists, then an entirety of a database can be lost. For typical consumer users, this can translate to loss of information associated with banking accounts, information related to photographs, entertainment, and the like, and various other data that is extremely important to an individual. Furthermore, a user can manually enter at least a portion of data within a database, and it may have required a substantial amount of time for the user to provide this information. In one example, a user may have thousands of different music files resident upon a hard drive, and ratings associated with the music files may have been manually entered by a user and stored in a database. A substantial amount of time was obviously necessary to enter such ranking data, and loss of such data due to data corruption will negatively affect user enjoyment associated with the music files. With respect to small businesses, corruption of a database can equate to loss of payroll information, tax information, profitability data, and various other data that is of extreme importance to the business. Thus, a loss of a database due to corruption therein can prove disastrous to both consumer users and small business users.

Conventionally, as consumers and small businesses typically do not employ DBAs, the only manner in which to protect themselves is to manually create backups of the database. Many users do not undertake such backups as they assume that their computers are not susceptible to data corruption. In other instances, a user may only sporadically remember to take a backup of an important database (e.g., once every few months). Therefore, even if such user does remember to backup the database, data within the backup may be obsolete in some respects. Moreover, if there is a corruption within data, the user must then manually copy data from the backup of the database and enter such data into an "original" database, thereby providing even further opportunity for human error (e.g., copying data to an incorrect location).

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention disclosed and claimed herein, in one aspect thereof, comprises a system that facilitates restoring a database utilizing automated page-level restore functionality. According to this aspect, a modification to a page or a portion thereof in a database can trigger a snapshot of the data page to be generated such that the snapshot comprises a pre-modification image of the data page. Snapshots can be generated via, for example, a volume shadow copy application. After an initial snap shot is generated and stored, subsequent snapshots can be generated stored at predetermined temporal intervals. Update logs can be maintained that record page modifications, and each snapshot can trigger truncation of the log. Upon the generation of a subsequent snapshot, the log portion resumed after the previous snapshot can be truncated, and the log can again be resumed to generate a new log portion associated with the new snapshot. In this manner, the system can generate and store backup information related to modifications to a data page for use in restoring the datapage should a corruption thereto occur prior to saving the data modified page.

According to a related aspect of the invention, data pages and/or portions thereof can be monitored to detect the presence of corrupt data therein. Detection of corrupt data can be facilitated by employing, for instance a checksum technique. Upon detection of corrupt data value(s), which can render the page in which it resides corrupt, stored snapshot copies of the page can be reviewed, for example, starting with the most recent snapshot and traversing snapshots backwards in time. A most-recent uncorrupted snapshot of the page can be identified and selected, and a log segment generated for that snapshot can be read forward in time. Update information recorded in the log can be applied to modify a copy of the snapshot to render it current up until the point of corruption.

The modified snapshot copy can then be utilized to replace the corrupt page in the database to restore the database while it remains online (e.g., the database need not be taken offline for data restoration), which improves system efficiency and user experience.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
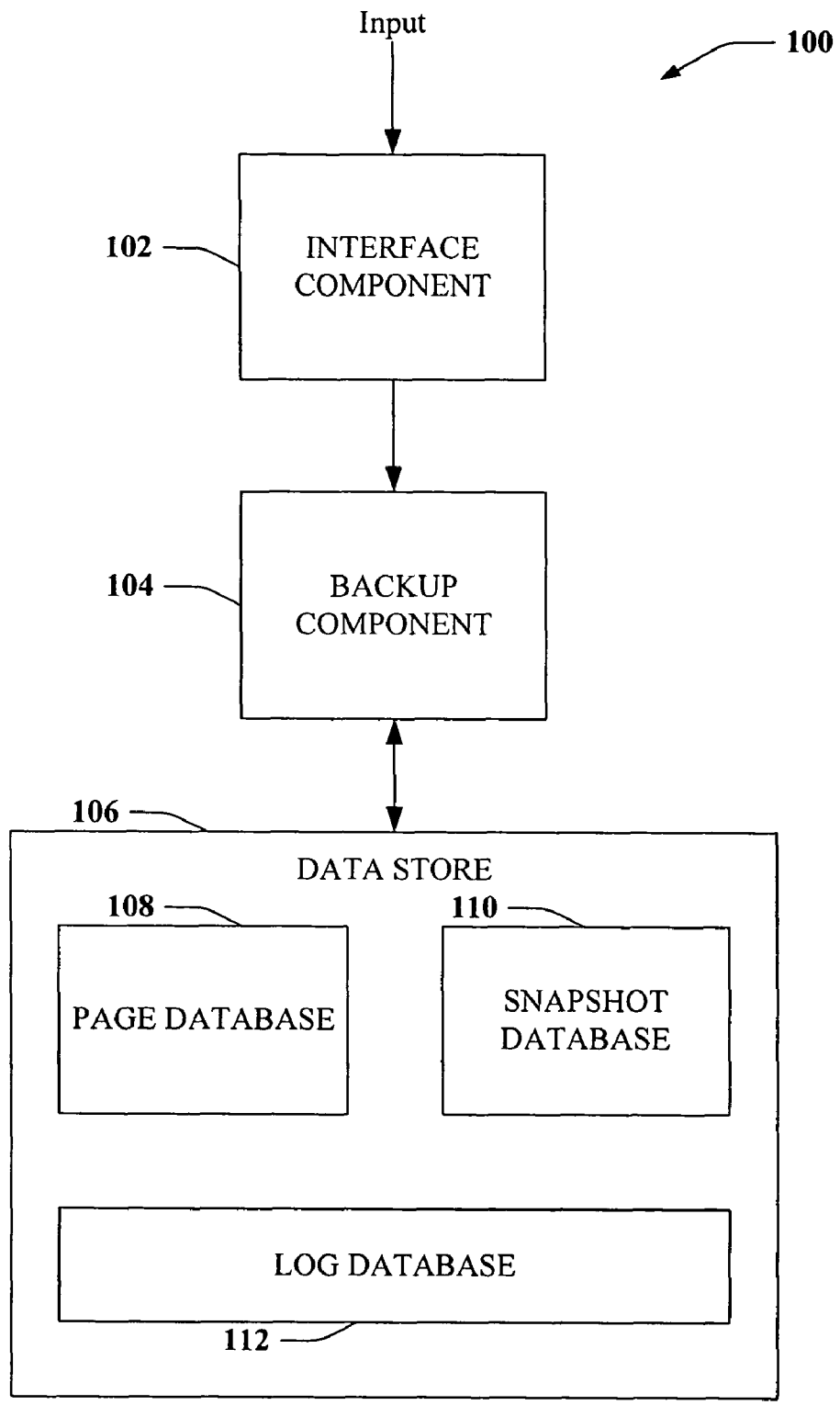
FIG. 1 illustrates a system that facilitates maintaining database availability while automatically restoring a corrupt page in the database, in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

The subject invention facilitates overcoming problems related to partial media failures during updating of a page of data in a database. For instance, a power failure during an update to a data page can result in an occurrence that is known as a "torn write," wherein a portion of the data page is updated while another portion is not updated. Such a partially written page is corrupt from a database standpoint. When the database is restarted (e.g., power is reapplied thereto), the corruption is detected and the database is typically taken offline, which has the undesirable side effect of detrimentally affecting availability of the database to applications and/or end-users. Conventional backup/restore mechanisms can be unnecessarily complicated and require a complete database restore which can be time-consuming and can even further adversely affect database availability. Thus, the subject invention provides for systems and methodologies that are more robust and autonomous than conventional systems by facilitating page-level restore of corrupted data pages in a database.

Referring now to FIG. 1, there is illustrated a system 100 that facilitates maintaining database availability while restoring a corrupt page in the database, in accordance with an aspect of the subject invention. The system 100 comprises an interface component 102 that can receive input related to modifying data in a database 106 or a page thereof. For example, the input can comprise information related to a user's modifications of a document (e.g., a word-processing document, a digital image such as a JPEG, a GIF, etc., and/or any other suitable document that can be altered by a user) and/or can comprise modification information from a computer application, etc. For instance, the interface component 102 can be an input device such as a mouse, a keyboard, a microphone, a stylus, or any other suitable input component that permits a user to enter information related to data modification. Additionally and/or alternatively, the interface component 102 can be a computing device such as a personal computer, a PDA, a cell phone, a laptop, and the like.

The modification information can be received by a backup component 104 that provides a variety of functionality to the system 100. For instance, upon receipt of information related to a desired change to data in a data page in a page database 108, the backup component 104 can generate a snapshot pre-image of the data page in which data is to be modified and/or updated while permitting a data store (e.g., a database) 106 to remain online and available, and can store the pre-image in a snapshot database 110. In this manner, the backup component 104 can generate a pre-image of the data page to be updated prior to the actual update at a volume level below a file system associated with the data store 106. Snapshots can be taken by the backup component 104 at predefined intervals, such as, for example, every five minutes, every hour, every two hours, etc. Additionally, snapshots of a data page can be stored in a stack format in the snapshot database 110, utilizing a first-in-first-out inventory mechanism. For example, a predetermined number of snapshots can be permitted with regard to a data page (e.g., 20, 24, 40, . . . ), whereby upon generation of a subsequent snapshot (e.g., $21^{st}$, $25^{th}$, $41^{st}$, . . . ) the oldest snapshot in the stack can be discarded from the snapshot database 110. Discarded snapshots can be deleted, stored in another database, compressed and archived, etc.

When generating a snapshot of a data page, the backup component 104 can employ, for example, a volume shadow copy application (not shown) that facilitates creating consistent shadow copies across a plurality of volumes. For instance, shadow copies can be stored as snapshots in the snapshot database 110. Additionally, the log database 112 and/or a segment thereof as of the time of the snapshot can be stored as part of its associated snapshot in the snapshot database. The shadow copy application can mitigate interruption to an application while generating a snapshot of data associated therewith. Updates to a data page in the page database 108 between snapshots can be logged in a log database 112, where individual update events can be associated with a log sequence number and stored chronologically. Log segments can additionally be segmented and/or truncated to delineate temporal spaces between snapshots. Upon detection of a corrupt data page or a portion thereof, the backup component 104 can locate a most recent uncorrupted snapshot of the data page from the snapshot database and can then employ logged update events from the log database 112 to make the snapshot current. The updated snapshot can be stored in the page database 108 prior to updating, and can be updated (e.g., written to) according to the transaction log database 112 to restore the page with which it is associated. A corrupt page can thus be repaired by copying a snapshot of the page prior to corruption, replacing the corrupt page in the page database with its most recent uncorrupt snapshot, and updating the page snapshot via logged update information to cause the snapshot to resemble the page immediately prior to the corrupting event.

According to a related aspect, snapshots can be made of portions of a data page and stored accordingly. For instance a data page can typically comprise approximately 8 kilobytes of data, such that corruption of a single portion thereof renders the entire page corrupt. The backup component 104 can parse a data page into chunks if desired, to create varied levels of granularity with regard to data backup and restoration. For example, the backup component can chunk pages into 2-kilobyte sections, such that each section of a data page can have snapshots and/or logs associated therewith upon the occurrence of one or more update events related to a particular page section. The invention is not limited in the number of sections or the size thereof into which a data page can be partitioned.

The following is an example of pseudo-code that can facilitate restoring a data page from logged update information in accordance with an aspect of the invention:

```
RESTORE DATABASE <database> PAGE=<pageIDa>,
    PAGE=<pageIDb>,PAGE=<pageIDc>,PAGE=<pageIDd>
    FROM <file_backup_of_fileB>
    WITH NORECOVERY;
RESTORE LOG <database> FROM <log_backup>
    WITH NORECOVERY;
RESTORE LOG <database> FROM <log_backup>
    WITH NORECOVERY;
--If a tail-log backup is required, restore it:
```

-continued

```
RESTORE LOG <database> FROM <tail_log_backup>
    WITH RECOVERY;
```

The above syntax can be extended to provide for the volume snapshots described herein, where such extended syntax can provide for volume snapshots as a source of data and log pages in both the RESTORE DATABASE and RESTORE LOG statements above. Such can facilitate marking a page as being "under recovery" in, for example, a file header, a buffer header, etc.

Additionally, a volume snapshot can comprise recovered database pages in order to facilitate logical recovery of objects by an end-user. Conventional recovery systems can cause an "undo" command to touch pages and/or copies thereof, rendering them useless for repairing a corrupt page. The system 100 can be designed to facilitate restore functionality while preserving snapshot copies that are touched by an "undo" command during recovers. For example, a statement such as "RESTORE database WITH standby='undo file name'" is representative of a syntactical extension that can be provided when extending the above-described restore syntax. In this manner, snapshots can be employed to facilitate repairing corrupt pages in a database. For instance, if a transaction (e.g., a modification, . . . ) is in progress (e.g., incomplete) when a snapshot is taken according to a pre-defined schedule, the snapshot might not contain all modifications made during the transaction. In order to facilitate making the snapshot transactionally consistent, the system 100 can "undo" modifications in the snapshot to return the snapshot to its pre-image state. Additionally, the system 100 can employ a recovery technique with stand-by mode functionality during the snapshot modification and can store a modified "post-image" of the page after modification, which also can be stored in the snapshot database 110 to be employed when restoring a corrupt data page.

Figure 2:
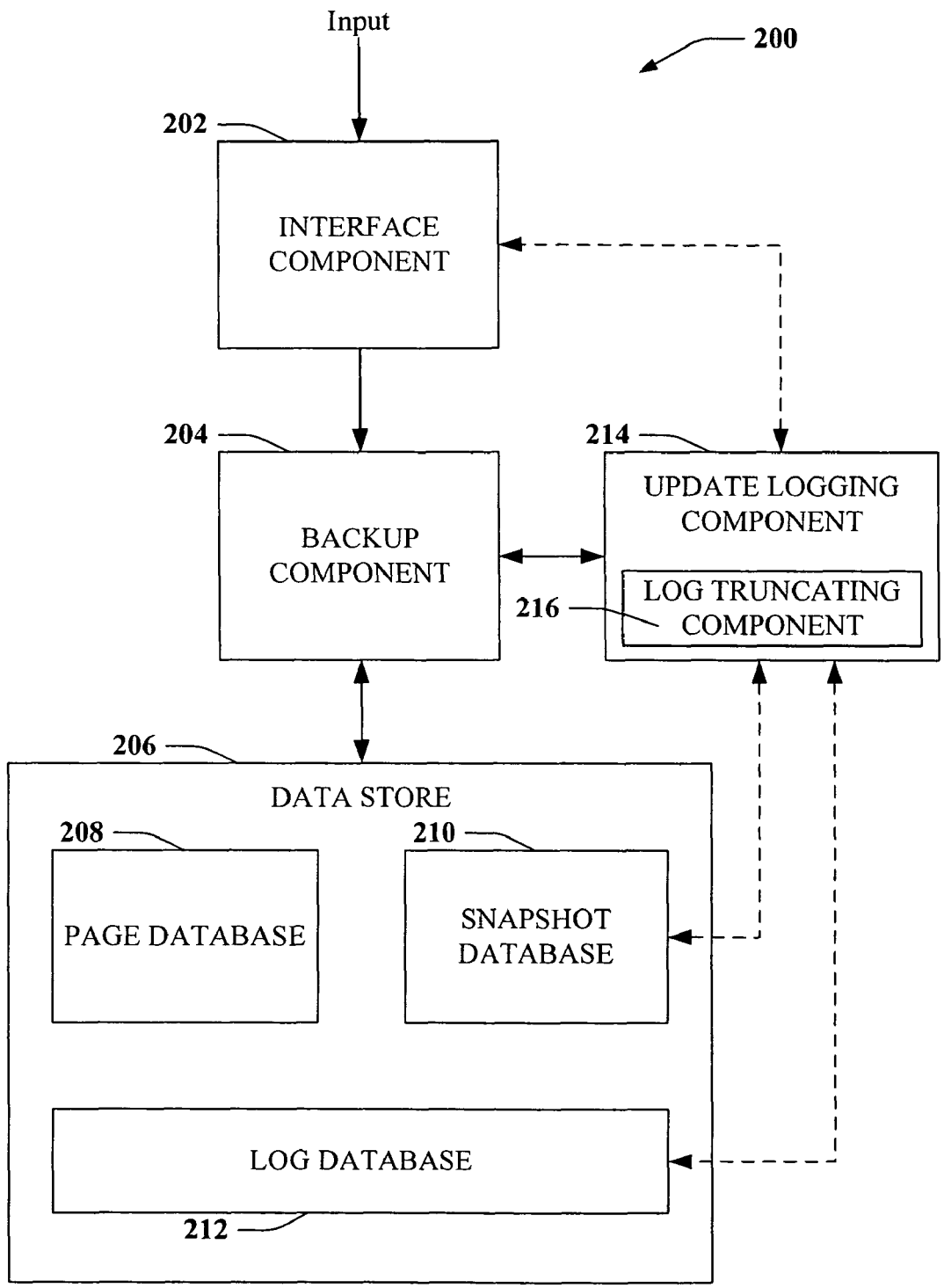
FIG. 2 is an illustration of a system that facilitates logging update events related to data modification to provide seamless data recovery while mitigating database unavailability in accordance with the subject invention.

FIG. 2 is an illustration of a system 200 that facilitates logging update events related to data modification to provide seamless data recovery while mitigating database unavailability in accordance with the subject invention. The system 200 comprises an interface component 202 via which a user and/or computer-related system can initiate one or more modifications to a data set. A backup component 204 can receive information from the interface component 202 related to imminent modifications, and can instantiate a plurality of actions in a data store 206 operatively coupled thereto. For example, incoming modification information can be related to changes to a data page in a page database 208. Such information, when recognized by the backup component 204, can trigger a snapshot to be taken of the data page(s) to be modified prior to modification, which snapshot can be stored in a snapshot database 210. The modification can then be made to the data page while the initial pre-modification image is stored in the snapshot database 210 in case it is needed to facilitate restoring data in the data page. After the initial snapshot of the data page, which can be triggered by an initial incoming modification signal, the backup component 204 can generate subsequent snapshots of data pages according to a predetermined schedule. Page changes that occur between snapshots can be stored in a log database 212 that comprises update events related to each modified data page.

Additionally, the system 200 comprises an update-logging component 214 that identifies updates associated with pages in the page database 208 and which can assign unique log sequence numbers to such events to facilitate efficient assessment thereof in the event that such information is required to facilitate a page restore. The update-logging component 214 can be in bidirectional communication with either or both of the interface component 202 and the database 206 and/or sub-components there of (e.g., the page database 208, the snapshot database 210, and/or the log database 212. Additionally, the update-logging component 214 can be separate from the back-up component (e.g., as illustrated) or can be integral thereto.

The update-logging component 214 can comprise a log-truncating component 216 that truncates a log associated with modifications to data pages in the page database 208 upon generation of a snapshot of one or more data pages to be modified by the backup component 204. In this manner, a snapshot can operate as a bookmark of sorts, such that snapshots can delineate log segments. Additionally, if a snapshot is determined to be free of corruption, then a truncated log segment preceding it need not be reviewed because it can be determined from the snapshot that all updates to the data page(s) prior to the snapshot are exculpated with regard to the corruption. The log truncation component 216 can employ a database consistency checker command to identify a particular log sequence number, and upon a successful snapshot, the log can be truncated up until the identified log sequence number.

Figure 3:
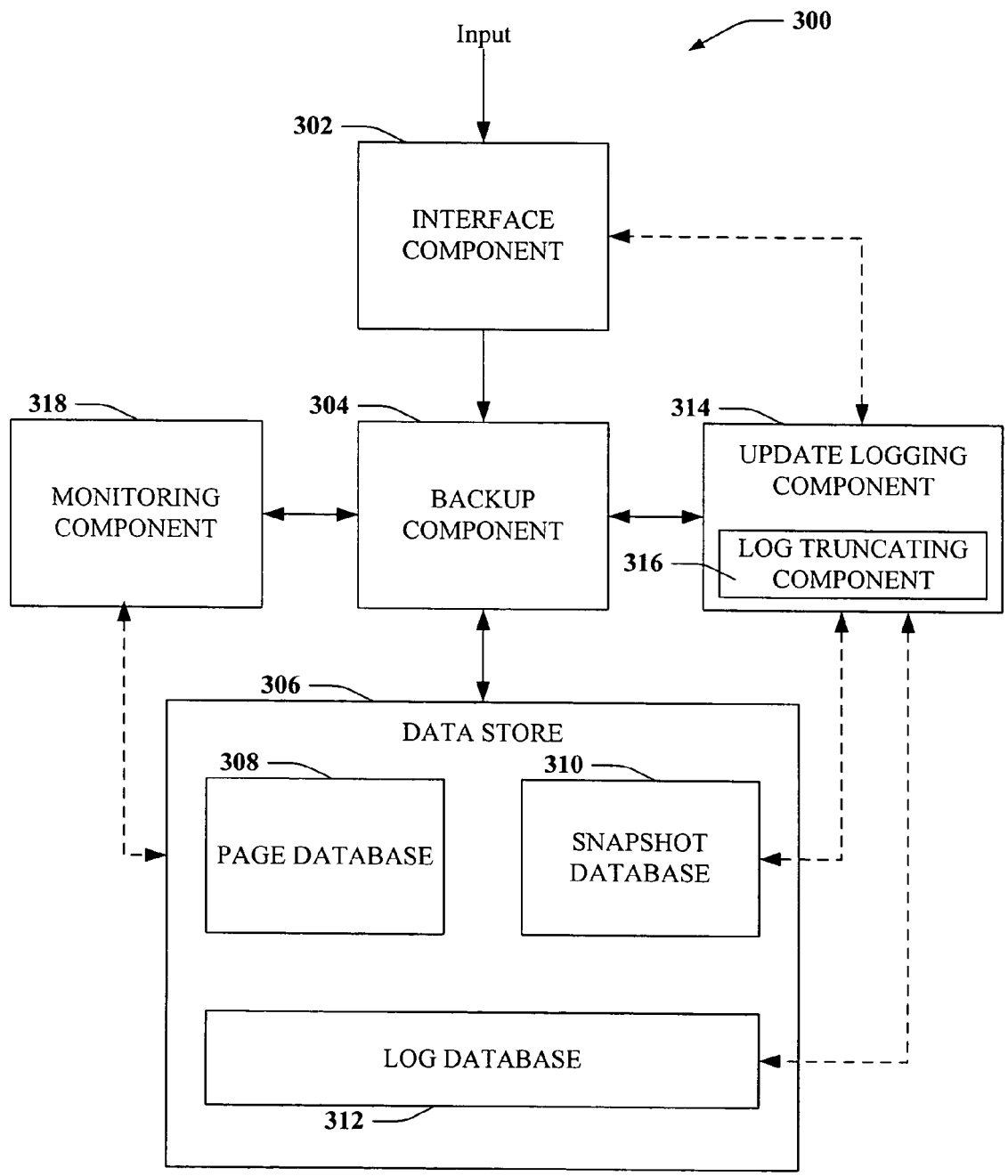
FIG. 3 is an illustration of a system that facilitates detecting corrupt data in a page in a database to trigger an automated page-level restore in accordance with the subject invention.

FIG. 3 is an illustration of a system 300 that facilitates detecting corrupt data in a page in a database to trigger a page-level restore in accordance with the subject invention. The system 300 comprises an interface component 302 via which a user and/or computer-related system can initiate one or more modifications to a data set, and a backup component 304 that can receive information from the interface component 302 related to imminent modifications and initiate actions in a data store 306 operatively coupled thereto. For example, incoming modification information can be related to changes to one or more data pages in a page database 308, and can be recognized by the backup component 304 to trigger generation of an initial snapshot of the data pages to be modified prior to modification, which can be stored in a snapshot database 310. The modification can then be made to the data page(s) in the page database 308 while the initial pre-modification image is stored in the snapshot database 310 in case it is needed to facilitate restoring data in the data page(s). After the initial snapshot of the data page, the backup component 304 can generate subsequent snapshot copies of the data page according to a predetermined schedule. Page changes that occur between snapshots can be stored in a log database 312 that comprises update events related to each data page modification. The backup component 304 can be operatively coupled to an update-logging component 314 that populates the log database 312 with update event information and assigns a log sequence number to each update event log entry to facilitate post-corruption analysis of update events. The update-logging component 314 can comprise a log truncation component 316 that recognizes a successful generation of a snapshot and truncates the log segment associated with the snapshot. In this manner, log segments are generated that comprise logged update event information between snapshots.

The system 300 further comprises a monitoring component 318 that monitors the database 306 and/or the page database 308 to determine whether data corruption has occurred. Additionally, the monitoring component 318 can determine a magnitude of data corruption, location of data corruption (e.g., particular page and/or section thereof, . . . ), whether detected corruption is associated with a particular type of page, such as a boot page, etc. The monitoring component 318 can employ a corruption detection technique (e.g., a checksum technique, . . . ) to determine whether a corrupted data value is present in a page or a portion thereof, and can communicate with the backup component 304 to initiate a restore procedure as necessary. For example, the checksum can be 8 bits (e.g., modulo 256 sum, . . . ), 16 bits, 32 bits, or any other suitable size, and can be computed by summing the bytes or words of the data page ignoring overflow. The checksum can be negated if desired so that the total of the data words plus the checksum is zero. Upon receipt of information indicative of a corrupted page, the backup component 304 can identify a most recent uncorrupted snapshot of the page, can copy the snapshot image to the page location in the page database 308, and can apply updates to the snapshot via the log database 312 by reading and applying updates in the log database 312 from the non-corrupt snapshot forward to restore corrupt page.

Figure 4:
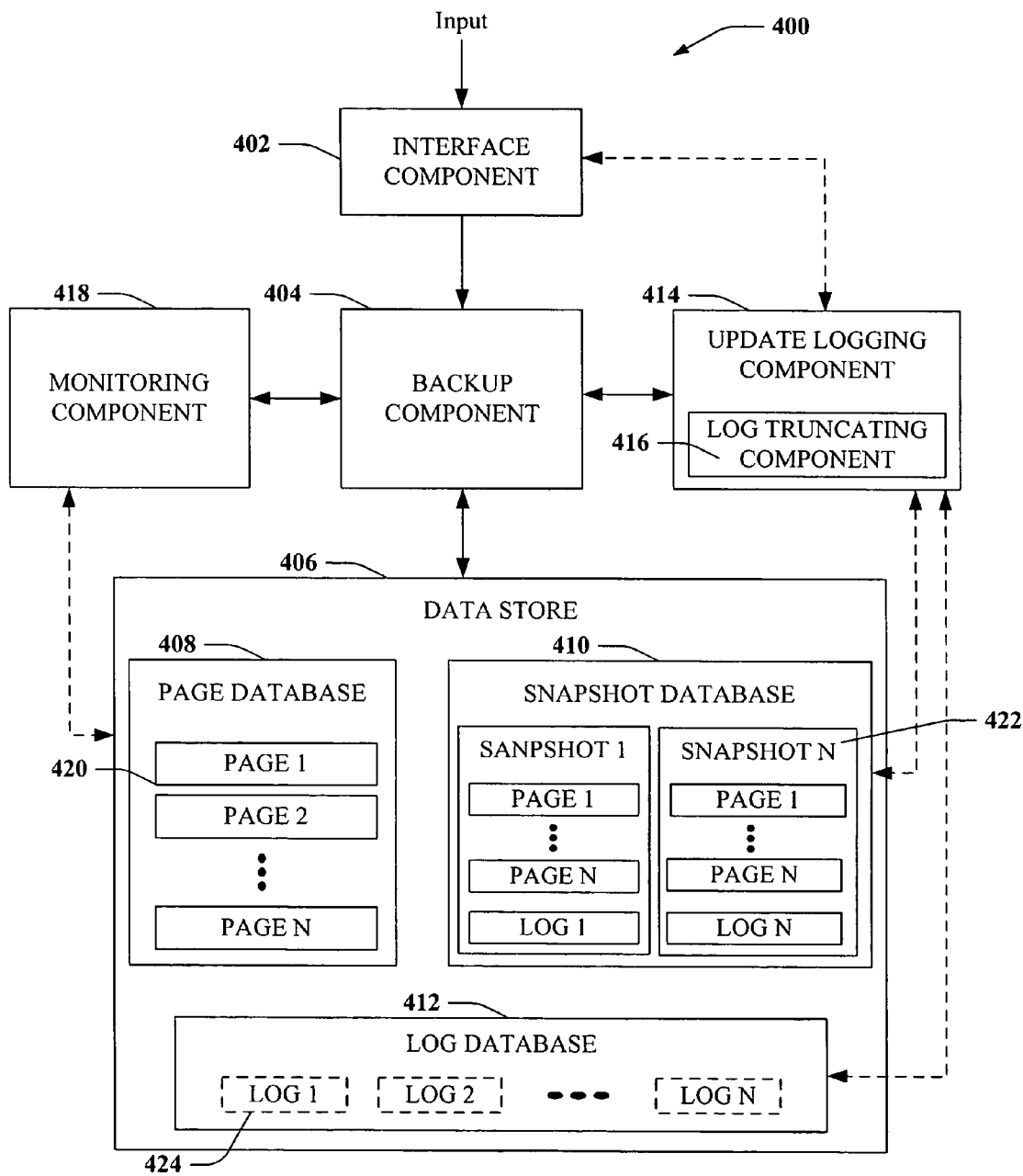
FIG. 4 is an illustration of a system that facilitates page-level restore of a corrupt page in a database in accordance with an aspect of the subject invention.

FIG. 4 is an illustration of a system 400 that facilitates page-level restore of a corrupt page in a database in accordance with an aspect of the subject invention. The system 400 is similar to the system 300 described supra with regard to FIG. 3, and comprises an interface component 402 that is operatively coupled to a backup component 404, which is in turn operatively associated with a data store 406. The data store 406 can comprise a page database 408 that stores data in pages (e.g., structured query language databases typically comprise data pages of approximately 8 kilobytes each, . . . ), a snapshot database 410 that stores snapshots of modified pages, and a log database 412 that stores information related to chronological modifications to the one or more modified pages. Additionally, the system 400 comprises an update-logging component 414 that can recognize a page modification and can generate an update event that can be stored in the log database 412 (e.g., such entries can be assigned a unique log sequence number). The update-logging component 414 can additionally comprise a log-truncating component 416 that can truncate a log for the page database 408 upon generation of a snapshot for the database 408 by the backup component 404. Still furthermore, the system 400 comprises a monitoring component 418 that can perform diagnostic actions on the data store 406 and/or the page database 408, such as a checksum technique, to determine whether data stored therein has been compromised (e.g., corrupted, . . . ).

FIG. 4 further illustrates a plurality of pages 420 in the page database 408, numbered page 1-N. It is to be appreciated that the numbering convention suggested in FIG. 4 is illustrative only, and that other numbering conventions (e.g., 0-N, . . . ) and/or other identification schemes are intended to fall within the scope of the subject invention. The snapshot database 410 is illustrated with a series of snapshots 422, numbered 1-N, which comprise snapshot pre-images of pages to be modified and a log segment associated with each snapshot. It will be appreciated that any number of snapshots 422 can be comprised by the snapshot database 410. Finally, the log database 412 is illustrated with a plurality of log segments 424. Log segments 424 are depicted with hashed lines to illustrate that although a log segment can be persisted in the log database 412 while recording update events, each log segment 424 can be copied to the snapshot database 410 with its associated snapshot upon truncation. Thus, when a log segment 424 is truncated, it can be deleted from the log database 412. Although only one series of log segments 424 is depicted, it is to be understood that a copy of the log database 412 and/or individual truncated log segments 424 therein can be copied to the snapshot database 410 and/or can be present in multiple copies. Additionally, it is to be appreciated that the numbering convention suggested in FIG. 4 is illustrative in nature, and that other numbering conventions (e.g., 0-N, . . . ) and/or other identification schemes are intended to fall within the scope of the subject invention.

According to an example, a modification can be received by the backup component 404 from the interface component 402, where the modification relates to a change to data stored in page 1. Page need not necessarily be the first page (e.g., first 8 kilobytes) in the page database 408, but rather can be the first page to be modified. Prior to updating Page 1, the backup component 404 can generate a snapshot of the page with unmodified Page 1 and store it in the snapshot database 410 in Snapshot 1. Log segment 1 can be initiated upon the modification and can record update events for the page database 408 from generation of Snapshot 1 forward and can be stored in the log database 412 as well as in Snapshot 1 of the snapshot database 410. Snapshot 2 can be generated after a predetermined time period (e.g., 5 minutes, 1 hour, . . . ) and can be stored in the snapshot database 410. Upon the creation of Snapshot 2, Log segment 1 is truncated and Log segment 2 is initiated. This process can be reiterated N times to facilitate backing up modification data for the page database 408 indefinitely.

To further this example, if the monitoring component 418 determines that Page 1 is corrupt at some temporal point between Snapshot 1 and Snapshot 2, then the backup component 404 can select the page pre-image from Snapshot 1, which can be verified to be free of corrupt values by the monitoring component 418, can copy the page pre-image to the page's location in the page database 408 and update the copied page according to update information contained in the Log segment for Snapshot 1 (e.g., update information logged after the generation of Snapshot 1, . . . ) to restore the page database to an original non-corrupt state.

Figure 5:
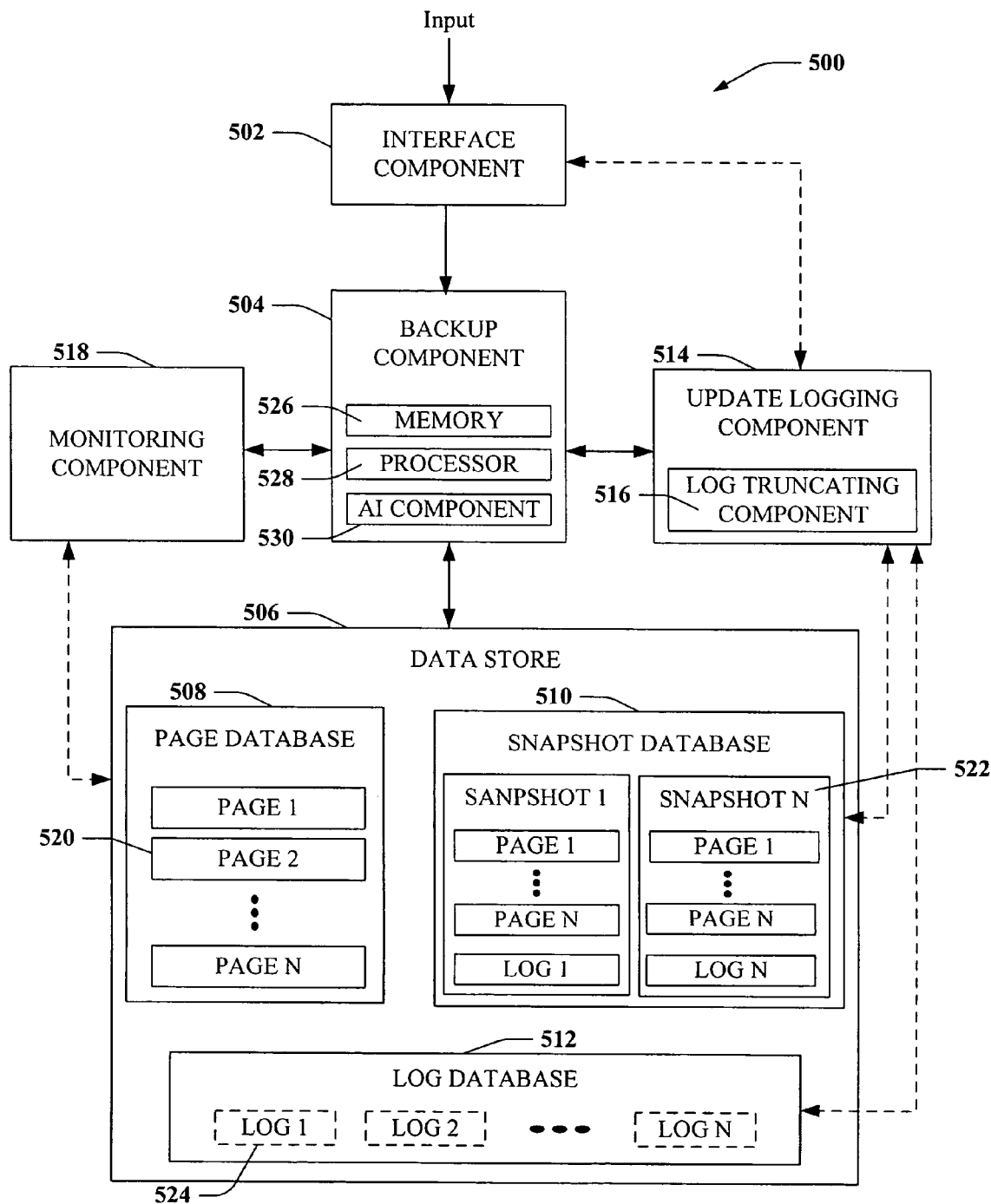
FIG. 5 is an illustration of a system that facilitates page-level restore functionality for a database in accordance with an aspect of the subject invention.

FIG. 5 is an illustration of a system 500 that facilitates page-level restore functionality for a database in accordance with an aspect of the subject invention. The system 500 comprises an interface component 502, a backup component 504, and a data store 506, as described with regard to the previous Figures. The data store 506 can comprise a page database 508 that stores a plurality of data pages 520, a snapshot database 510 that stores snapshots 522 of data pages 520, and a log database 512 that comprises log segments 524 of information regarding updates and/or modifications to data pages 520. The system 500 further comprises an update-logging component 514, a log truncation component 516, and a monitoring component 518.

According to the figure, the backup component 504 comprises a memory 526 and a processor 528. It is to be appreciated that the processor 528 can be a processor dedicated to analyzing and/or generating information received by the backup component 504, a processor that controls one or more components of the system 500, and/or a processor that both analyzes and generates information received by the backup component 504 and controls one or more components of the system 500.

The memory 526 can additionally store protocols associated with generating snapshots, logs, etc., such that the system 500 can employ stored protocols and/or algorithms to achieve page-level restore as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 526 of the subject systems and methods is intended to comprise, without being limited to, these and any other suitable types of memory.

The backup component 504 is further operatively associated with an artificial intelligence (AI) component 530 that can make inferences regarding operation of the system 500. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The subject invention can employ various artificial intelligence based schemes for carrying out various aspects thereof. For example, a process for determining when to generate snapshot(s) for a data page, how to chunk a data page into smaller portions, etc., can be facilitated via an automatic classifier system and process. Moreover, where the data page has several corrupt snapshots, the classifier can be employed to determine which snapshot is a most-recent uncorrupted snapshot, etc.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of data page restoration, for example, attributes can be recorded update information, snapshot information, page address, or other data-specific attributes derived from the tracked modification information related to the data page, and the classes are categories or areas of interest (e.g., levels of corruption, pages requiring restoration, . . . ).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVMs are configured via a learning or training phase within a classifier constructor and feature selection module. Thus, the classifier(s) can be used to automatically perform a number of functions, including but not limited to determining according to a predetermined criteria when to generate a first snapshot of a data page, how often to generate subsequent snapshots, when to initiate a page restore, a manner in which to traverse a snapshot sequence and/or logs associated therewith, and the like.

For example, the AI component 530 can infer a manner of reviewing snapshot logs associated with a datapage that has been determined to be corrupt. For instance, a snapshot log segment can be traversed in a forward direction from the first snapshot generated for the page just prior a first modification through subsequent snapshots until a corrupt snapshot is identified, at which point the uncorrupted snapshot immediately preceding the corrupt snapshot can be selected, an uncorrupt pre-image of the corrupt page can be copied to its corresponding page location in the page database 508 and can be updated according to the log beginning at the uncorrupted snapshot to a state immediately preceding the corruption. According to another example, in order to minimize restore time, the AI component 530 can infer that a reverse traversal of snapshots of a page can facilitate faster identification of a non-corrupt page, and can direct the system 500 to review snapshots starting with a most-recent snapshot. According to a related aspect, the AI component 530 can infer that it is desirable to increase a frequency of snapshots (e.g., in a scenario in which a large number of and/or substantial modifications are determined to be in progress with regard to the page or pages. In this case, snapshot frequency can be increased so that upon detection of corruption in one or more pages, log segments associated therewith can be shortened and thus traversed more quickly. The preceding examples are illustrative in nature, and are not intended to limit the scope of the manner in which the AI component 530 makes inferences or the number of inferences that can be made by the AI component 530.

Figure 6:
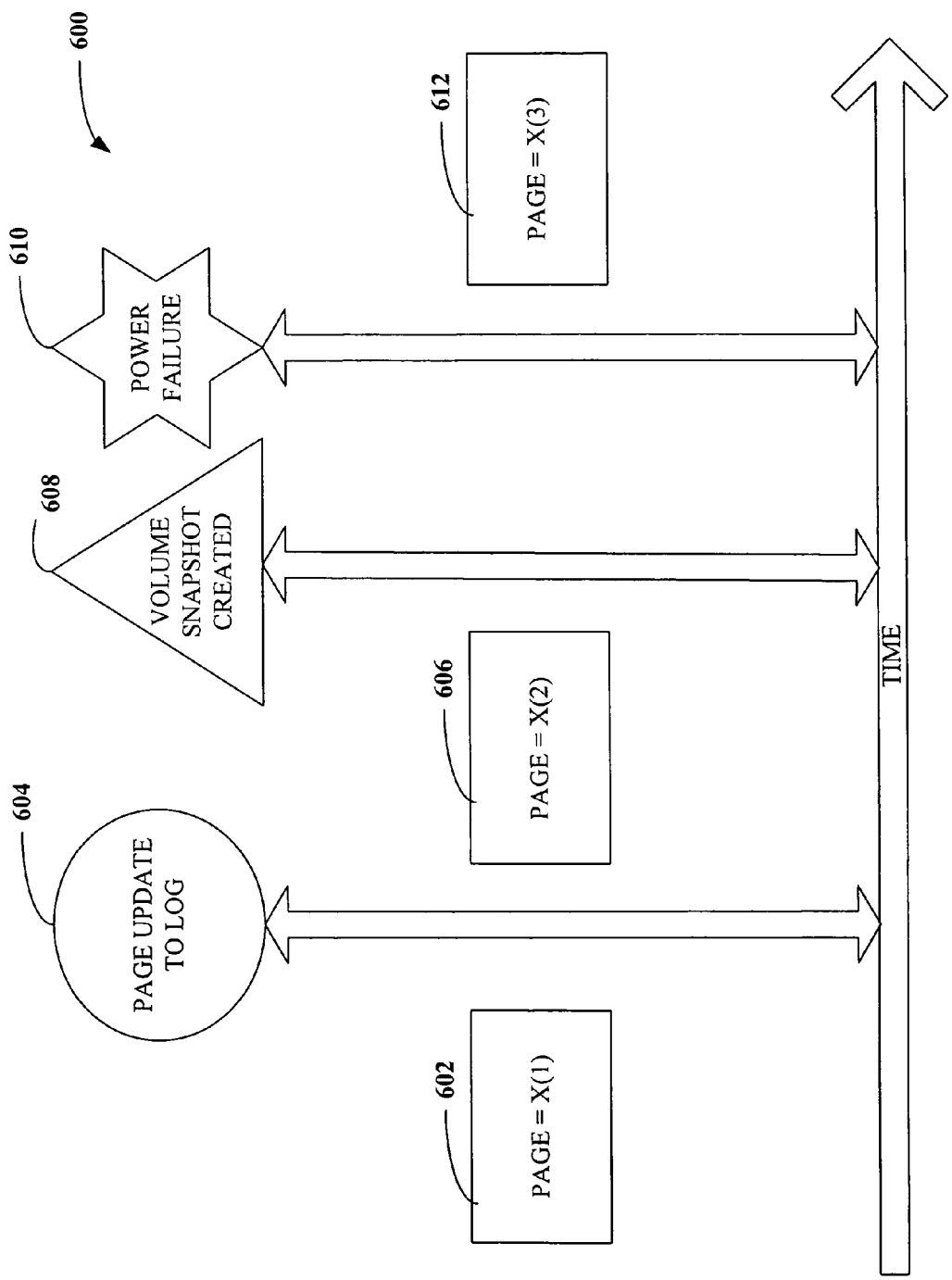
FIG. 6 is an illustration of a timeline and a series of events that can occur in accordance with one or more aspects of the subject invention.

FIG. 6 is an illustration of a timeline 600 and a series of events that can occur in accordance with one or more aspects of the subject invention. Initially, original contents of a database page, such as the page(s) described with respect to the preceding figures, can be represented as X(1) 602. An update to the original page 602 causes a record to be written to a log 604, which indicates that the contents of the page should change to generate page version X(2) 606. A volume snapshot 608 can be taken, which can in turn indicate that the log segment 604 can be truncated and a new log segment initiated from the time of the snapshot forward. Finally, a power failure 610 is illustrated to occur in the middle of an update to the page, causing the page to have contents X(3) 612, which are corrupt. The above-described systems facilitate traversing snapshots and log segments for the page from X(3) to X(1) to X(2), while the database storing the page remains online. In this manner, the page can be restored from the snapshot, and updates recorded in the log can be employed to update the snapshot to achieve contents consistent with the original modified data page immediately preceding the power failure.

Figure 7:
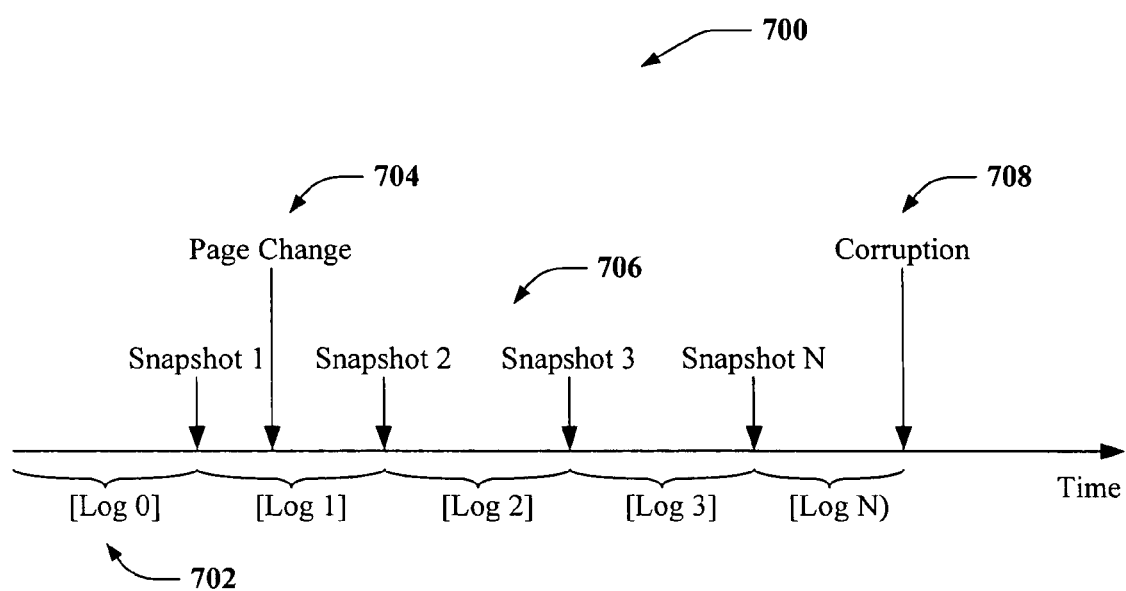
FIG. 7 illustrates a timeline that depicts a series of events associated with page-level restore functionality in accordance with aspects of the subject invention.

FIG. 7 illustrates a timeline 700 that depicts a series of events associated with page-level restore functionality in accordance with aspects of the subject invention. Log segment 0 702 is illustrated as preceding Snapshot 1 in the figure. It will be appreciated that Log segment 0 702 can be maintained for each page in a database in order to facilitate constant monitoring of all pages, while being optional to some aspects of the subject invention. Upon the occurrence of a page update, Snapshot 1 can be generated to provide a pre-image of the modified data page(s). For example, the page change can be identified and the snapshot can be generated in response thereto prior to actually modifying the page. The page change can be recorded in Log segment 1, which can be initiated upon generation of Snapshot 1. After a predefined time interval, snapshot 2 can be generated, which can trigger truncation of Log segment 1 and initiation of Log segment 2, and so on to generate a plurality of snapshots 706 and respective log segments. A corruption event 708 that occurs after a most resent snapshot, Snapshot N, triggers a page restore as detailed above with regard to the preceding figures. It will be noted that Log segments 0-3 are illustrated with closed brackets, indicating that they represent closed sets of events (e.g., update events, . . . ), while Log segment N, the most recent log segment, is delineated with a parenthesis, indicating that the set remains open as Log segment N has not been truncated in response to a subsequent snapshot.

Figure 8:
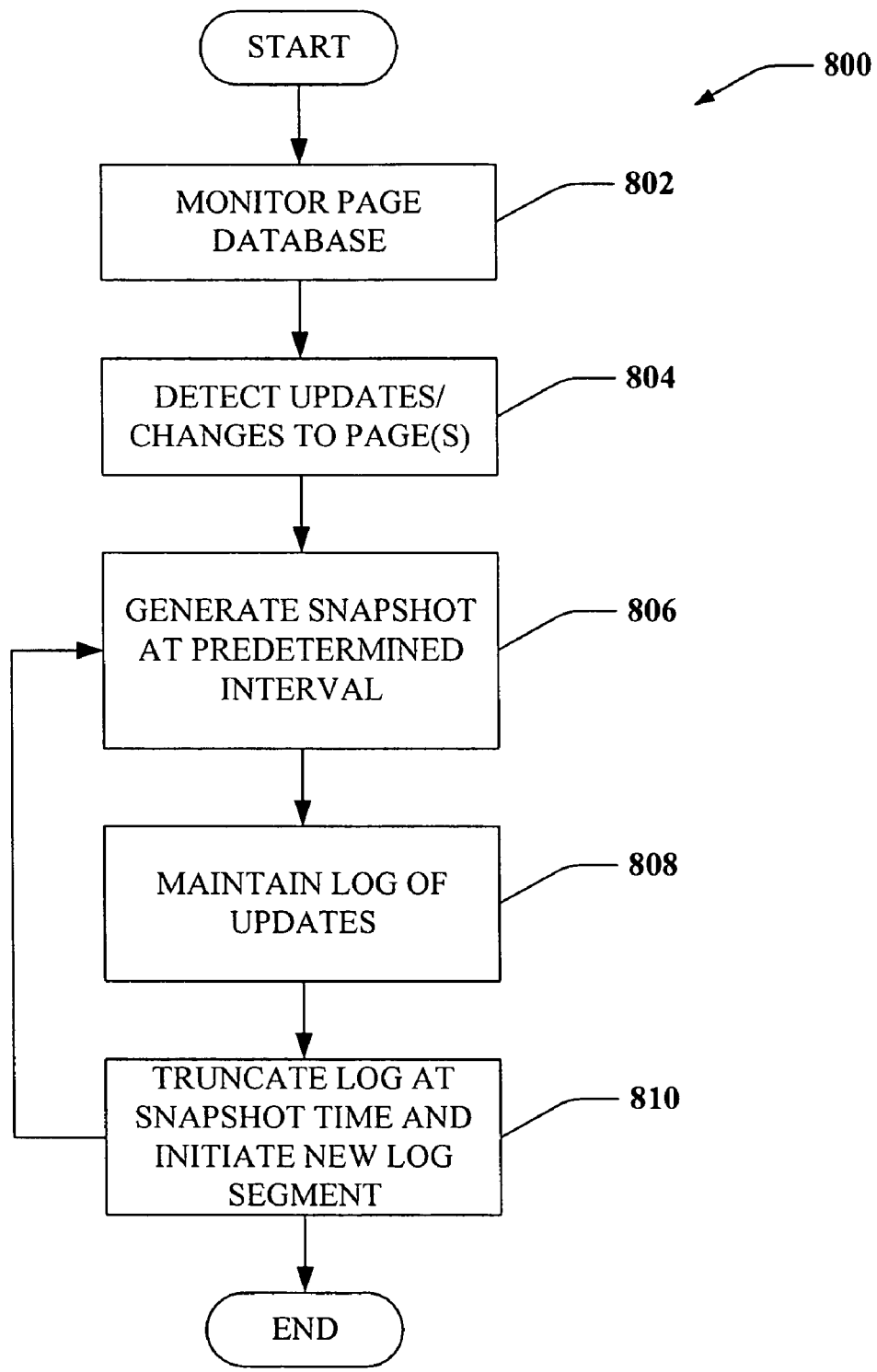
FIG. 8 is an illustration of a flow chart that describes a methodology for maintaining backup information that can be employed to perform a page-level backup of a database while mitigating detrimental effects to database availability during update, in accordance with an aspect of the subject invention.
Figure 9:
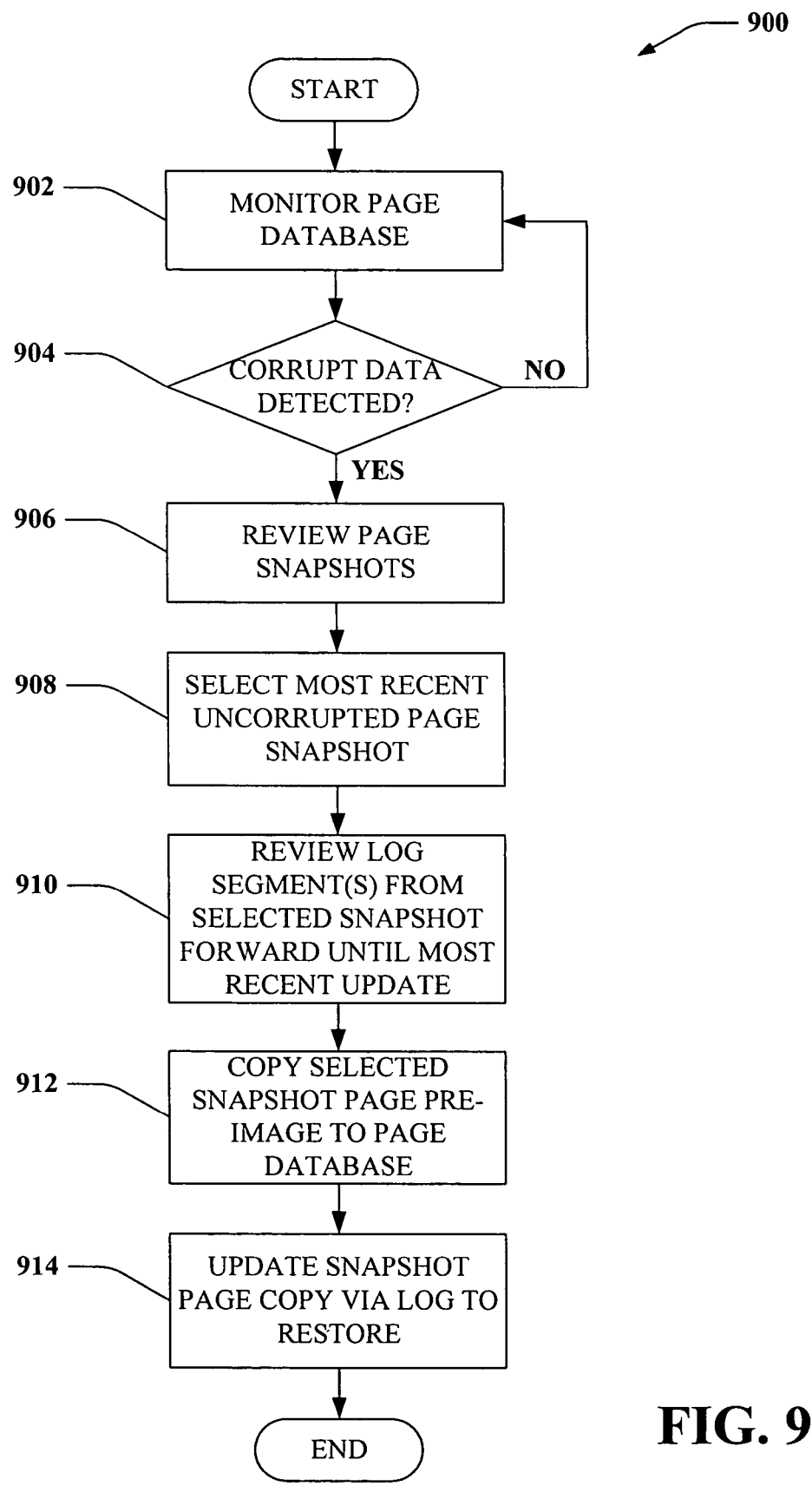
FIG. 9 is an illustration of a flow chart of a methodology for restoring data in a database at the data page level while mitigating database down time, in accordance with an aspect of the subject invention.
Figure 10:
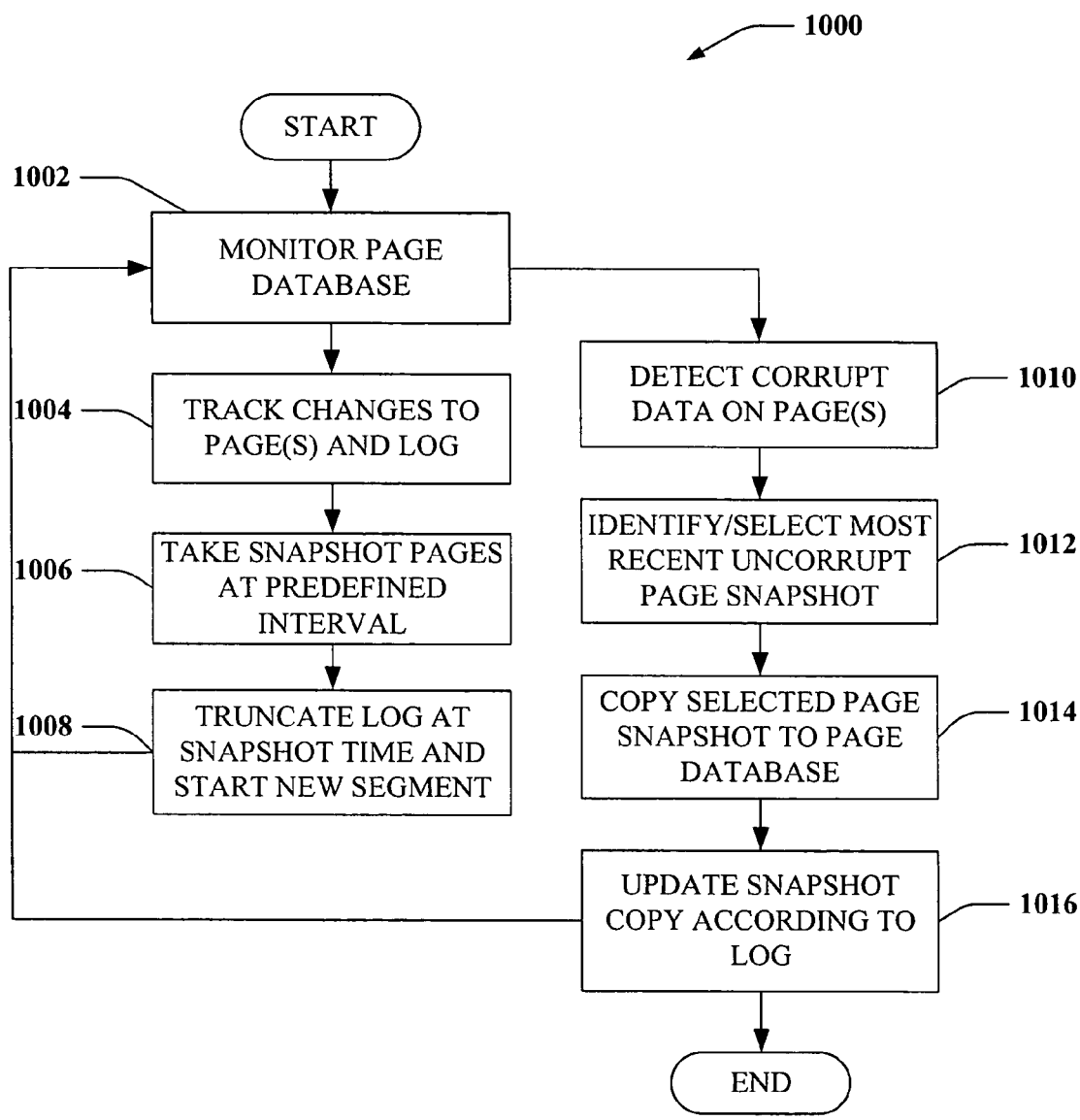
FIG. 10 illustrates a flow chart of a methodology for concurrently tracking data page modifications and restoring data in a database at a page-level while maintaining the database online, in accordance with an aspect of the invention.

With reference to FIGS. 8-10, there are illustrated flowcharts in accordance with aspects the subject invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

FIG. 8 is an illustration of a flow chart that describes a methodology 800 for maintaining backup information that can be employed to perform a page-level backup of a database while mitigating detrimental effects to database availability during update, in accordance with an aspect of the subject invention. Although the method 800 is described with regard to a single page in a database, it will be appreciated that all pages in a database can be subjected to the method 800 concurrently, serially, etc. Additionally, as described above, a data page can be chunked into portions that can facilitate increasing the rapidity with which the subject systems and methods can traverse data contained in the page and/or portions there of to detect corruption, generate snapshots and logs, and/or restore the page or a portion thereof.

At 802, one or more data pages in a database can be monitored. At 804, an incoming update/modification to a page can be detected. For example, a user can modify a word document, an image document, an email, etc., and such modifications can be detected at 804 as they are generated. Upon detection of an update event (e.g., a modification) at 804, a snapshot of the data page to which modification is imminent can be generated at 806. The first snapshot of a page can be triggered by the incoming page modification, and thereafter subsequent snapshots of the page can be taken at predetermined intervals (e.g., every 30 minutes, 60 minutes, 90 minutes, . . . ). Snapshots can be generated using, for example, a volume shadow copy application and/or any other suitable means for storing a version of a data page for future review, manipulation, restoration, and the like.

At 808, a log can be initiated for the data page(s), wherein update events can be recorded (e.g., logged and assigned a log sequence number). The log can comprise information related to updates that occur between one snapshot and a subsequent snapshot. At 810, a subsequent snapshot can be generated for the data page, which can trigger truncation of the log initiated at the previous snapshot and initiation of a new log segment comprising updates to the data page. In this manner, when page restore becomes necessary (e.g., due to power failure, corrupt data values in the page, . . . ) the snapshots can be reviewed to find a most recent snapshot containing an uncorrupt image of the corrupt page, which can be used as a base template and copied into the page location of the corrupt page in a page database. Log segment(s) can be read from the selected snapshot forward in time to update the selected page snapshot copy in order to bring it current with the data page immediately prior to the corrupting event in order to replace the corrupt page and complete the page-level restore of the database while maintaining database availability (e.g., the database need not be taken offline during restore).

FIG. 9 is an illustration of a flowchart of a methodology 900 for restoring data in a database at the data page level while mitigating database down time, in accordance with an aspect of the subject invention. At 902, a database can be monitored. The database can comprise a plurality of pages, for example 8-kilobyte pages such as are employed with regard to structured query language databases, and the like. The subject invention is not limited to pages of this size, and any suitable page size is intended to fall within the scope of the subject invention. Additionally, pages can be chunked into smaller sizes (e.g., halved, quartered, or chunked according to any other desired partitioning scheme, . . . ) to facilitate improving restore efficiency and/or speed and to provide granularity to aspects of the invention. At 904, a determination can be made regarding whether corrupt data is extant in the data page or a portion thereof. Such determination can be made, for example, by performing a checksum technique on the data page and/or portions thereof at regular intervals, upon updates, etc. If no corrupt data is detected the method can revert to 902 for continued monitoring of the data page.

If corrupt data is found in the data page, then at 906 snapshots containing a version of the page can be reviewed. Review of the snapshots can occur in reverse chronological order: for instance, a most recent snapshot can be reviewed first (e.g., a checksum technique can be performed thereon, . . . ). If corruption is found in the most recent snapshot, then the next previous snapshot can be evaluated, etc., until a most-recent uncorrupted snapshot of the page is found, which can be selected at 908. At 910, a log of recorded update events for the page subsequent to the snapshot but prior to a next snapshot can be traversed in a forward direction. At 912, the selected snapshot of the page can be copied to the page location in the database. Updates can be performed on the page snapshot copy up until the corrupting event, which can be determined using a checksum technique as updates are made to the snapshot, at 914.

FIG. 10 illustrates a flow chart of a methodology 1000 for concurrently tracking data page modifications and restoring data in a database at a page-level while maintaining the database online, in accordance with an aspect of the invention. At 1002, pages in a database can be monitored (e.g., a checksum technique can be continuously and/or repeatedly performed on data and/or pages thereof to detect corruption events that might arise). At 1004, changes to a data page can be tracked and logged as detailed supra with regard to FIG. 8. Snapshots of pages can be generated at 1006, at predefined intervals. Page modifications that occur between snapshots can be logged, and log segments can be truncated at snapshot time at 1008, after which the method can revert to 1002 for continued page monitoring and snapshot/log generation.

Concurrently, while modifications to a page are being tracked and logged via the loop 1002-1008, at 1010 corrupt data value(s) in a page can be detected (e.g., via the checksum technique, . . . ). Upon such corruption detection, at 1012 a most recent uncorrupt page snapshot can be identified and selected. At 1014, the non-corrupt snapshot of the data page can be copied to the database at the page location of the corrupt page. At 1016, the copied snapshot can be modified according to modification information recorded in a log segment that is rolled forward from the time of the snapshot to the time of the data corruption (e.g., up until a most-recent uncorrupted modification, . . . ) to facilitate restoring the data page, and thus the database, to an uncorrupted, current-up-to-the-moment state.

Figure 11:
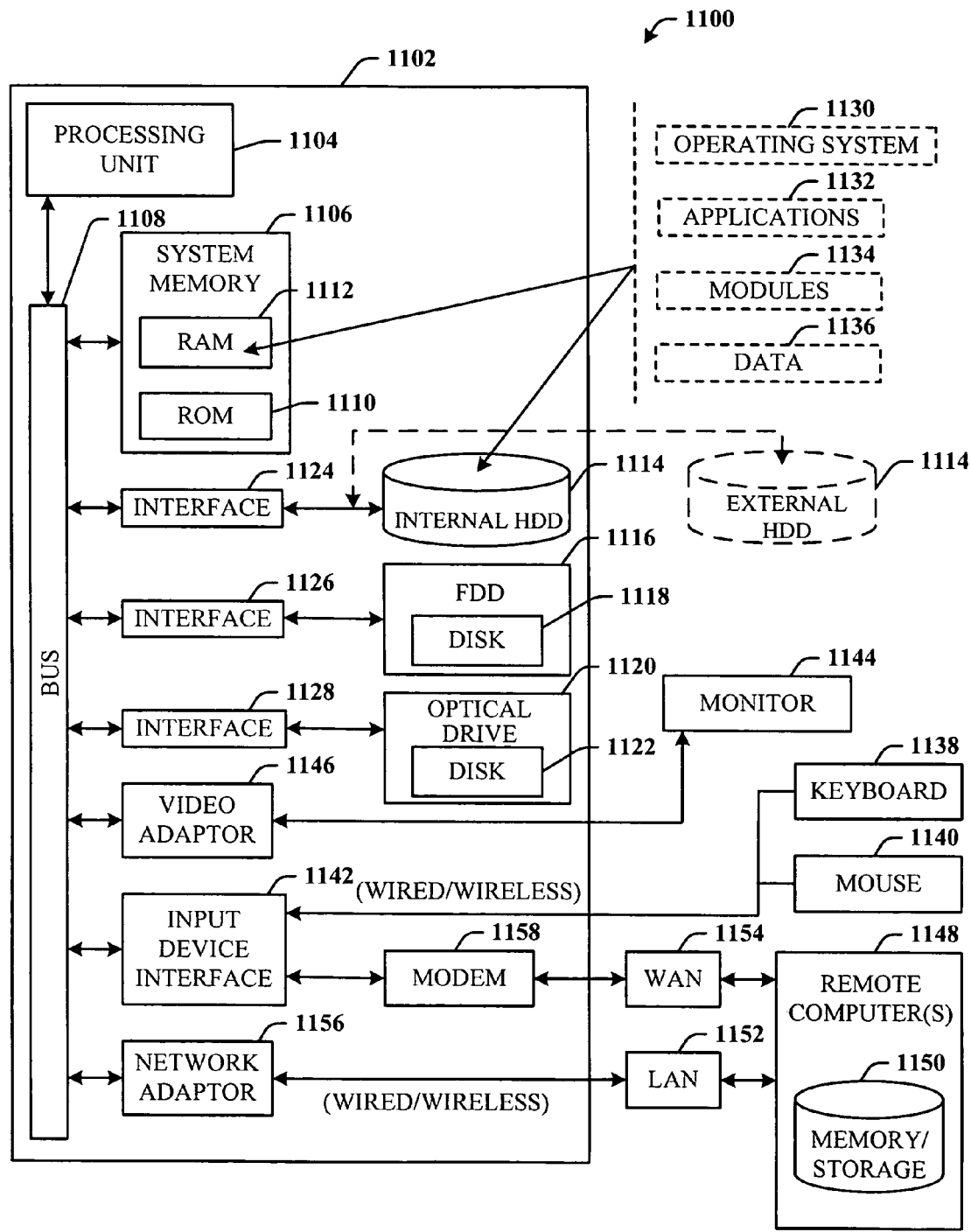
FIG. 11 illustrates a block diagram of a computer operable to execute the disclosed architecture.

Referring now to FIG. 11, there is illustrated a block diagram of a computer operable to execute the disclosed architecture. In order to provide additional context for various aspects of the subject invention, FIG. 11 and the following discussion are intended to provide a brief, general description of a suitable computing environment 1100 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, there is illustrated an exemplary environment 1100 for implementing various aspects of the invention that includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read only memory (ROM) 1110 and random access memory (RAM) 1112. A basic input/output system (BIOS) is stored in a nonvolatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the subject invention can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156. When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
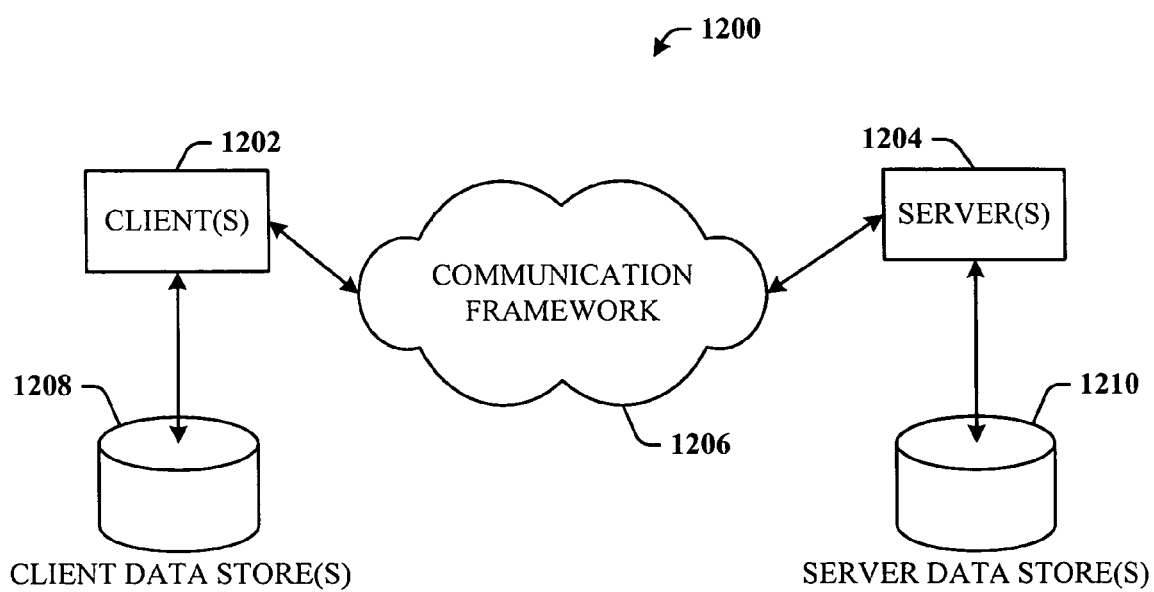
FIG. 12 illustrates a schematic block diagram of an exemplary computing environment in accordance with the subject invention.

Referring now to FIG. 12, there is illustrated a schematic block diagram of an exemplary computing environment 1200 in accordance with the subject invention. The system 1200 includes one or more client(s) 1202. The client(s) 1202 can be hardware and/or software (e.g., threads, processes, computing devices). The client(s) 1202 can house cookie(s) and/or associated contextual information by employing the subject invention, for example. The system 1200 also includes one or more server(s) 1204. The server(s) 1204 can also be hardware and/or software (e.g., threads, processes, computing devices). The servers 1204 can house threads to perform transformations by employing the subject invention, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates page-level data restore in a database, comprising computer readable memory having stored thereon the following components:

a monitoring component that automatically detects one or more corrupt data values in a data page by a classifier automatically detecting according to predetermined criteria when to initiate a page restore;

a backup component that generates backup copies of a data page, the data page being approximately 8 kilobytes of data in size and wherein the backup copies of the data page are created by backing up 2 kilobyte sections of the data page so that page level or partial page level restores can be accomplished thereby facilitating database restores accomplished without taking the database offline, in a memory upon a modification to the data page and generates update logs that store information related to page updates between backup copies, and restores a corrupt data page in the data base with a most recent uncorrupted backup copy of the data page by reading backup snapshots in a reverse chronological order from the corrupting event until the most recent uncorrupted backup copy is identified, replacing the corrupt page in the database with the most-recent uncorrupted backup copy, and modifying the most-recent uncorrupted backup copy to restore the database, the most-recent uncorrupted copy is modified according to update information obtained by traversing in a forward direction a log that records update events for the most recent uncorrupted copy subsequent to generation of the copy but prior to a next back up copy up until a point at which corruption occurred, wherein the backup component generates a first backup copy of the data page upon an indication that an update to the page is imminent, and wherein the first backup copy is generated before the modification;

an update log that records page modification events; and wherein the backup component generates subsequent backup copies of the data page at predetermined intervals and truncates the update log upon generation of a subsequent backup copy and resumes the log to generate a new log segment that is associated with the subsequent backup copy.

2. The system of claim 1, the monitoring component performs a checksum technique on data in the data page to determine whether the data page is corrupt.

3. A method of backing up data in a database at a page level, comprising:

detecting a modification to a data page in the database;

generating a pre-modification backup copy of the data page, the data page being approximately 8 kilobytes of data in size and wherein the backup copy of the data page is created by backing up 2 kilobyte sections of the data page so that page level or partial page level restores can be accomplished thereby facilitating database restores accomplished without taking the database offline;

generating an update log that records update events to the data page subsequent to generation of the pre-modification copy;

generating subsequent backup copies of the data page at predetermined intervals, each subsequent backup copy triggers a current log segment to be truncated and a new log segment to be generated;

monitoring data pages and automatically detecting corrupted data pages by a classifier automatically deciding according to predetermined criteria to initiate a page restore, including at least one of performing a checksum on the data page at regular intervals, or performing a checksum on the data page upon updates;

assessing backup copies of a corrupt data page in reverse-chronological order starting with a most-recent backup copy for the selection;

selecting a most-recent uncorrupted backup copy of the data page if the data page is corrupt;

replacing the corrupt data page with the selected backup copy of the data page; reading a log associated with the selected backup copy forward from the time of generation of the backup copy to evaluate update events recorded therein;

modifying the selected backup copy to be current to a point immediately prior to the occurrence of a corruption event that caused the corruption of the data page as indicated by update event information stored in the update log for the selected backup copy to generate a replacement page for the database; and replacing the corrupt page with the modified back up copy while maintaining the database online.

4. The method of claim 3, generating a post-modification image of the data page when a snapshot of the page is taken during, or prior to completion of, modification to the page to facilitate retaining current page modification information.

* * * * *